United States Patent [19]

Antonini

[11] Patent Number: 5,112,629
[45] Date of Patent: May 12, 1992

[54] METHOD FOR AUTOMATIC COFFEE BREWING

[76] Inventor: Michael Antonini, 40 Temple La., Suffern, N.Y. 10901

[21] Appl. No.: 720,960

[22] Filed: Jun. 24, 1991

Related U.S. Application Data

[62] Division of Ser. No. 487,194, Mar. 1, 1990, Pat. No. 5,027,696.

[51] Int. Cl.⁵ ............................................. A23F 5/00
[52] U.S. Cl. ................................... 426/231; 426/433
[58] Field of Search ......................... 426/231, 433, 77; 99/279, 282, 283, 318

[56] References Cited

U.S. PATENT DOCUMENTS

| | | | |
|---|---|---|---|
| 1,887,848 | 11/1932 | Peirce | 99/319 |
| 4,401,014 | 8/1983 | McGrail et al. | 99/287 |
| 4,767,632 | 8/1988 | Meier | 426/231 |

*Primary Examiner*—George Yeung
*Attorney, Agent, or Firm*—Abdallah & Muckelroy

[57] ABSTRACT

A method of automatic coffee brewing which reduces the amount of coffee required. A finely-meshed coffee basket containing coffee grounds is automatically lowered into a coffee pot and stored water fills the pot. A heating element brings the water to a boil and the coffee grounds are then steeped in the water to more efficiently extract the flavorings from the coffee grounds. The coffee basket is automatically raised as directed by a timer included in the coffee maker.

6 Claims, 2 Drawing Sheets

METHOD FOR AUTOMATIC COFFEE BREWING

This application is a divisional application of U.S. Ser. No. 487,194, filed Mar. 1, 1990 and entitled "Device For Automatic Coffee Brewing", now U.S. Pat. No. 5,027,696. The disclosure of the U.S. Pat. No. 5,027,696 is incorporated by reference.

BACKGROUND OF THE INVENTION

The present invention generally relates to methods in automatic coffee makers. More specifically, this invention relates to a method of making coffee that uses coffee grounds more efficiently than available in conventional automatic coffee makers.

Conventional automatic coffee makers generally utilize a "drip process" to brew coffee. Heated water is filtered through coffee grounds and thereafter allowed to drip into a coffee pot for storage and dispensation. The coffee stored in the coffee pot is kept warm by a heating element maintained in heat exchanger relationship with the bottom of the coffee pot. Thus, during the warming phase of the "drip process" of automatic coffee brewing the stored coffee continues to brew, albeit at a reduced rate.

A particular disadvantage of the "drip process" is the inefficient use of coffee grounds The conventional method underutilizes the coffee grounds in two ways. Firstly, the coffee grounds must be measured to consider the continued slow brewing during the warming phase. Secondly, the natural flavorings of the coffee grounds are not fully extracted by this method. Thus, a portion of the flavorings in the coffee grounds is wasted. It should then be understood that a greater amount of coffee grounds is required per cup of coffee than would otherwise be required in a method of coffee brewing that more efficiently extracts the flavorings from the coffee grounds.

Various methods for automatic coffee brewing are shown in the prior art. In U.S. Pat. No. 1,211,614 to Morales a method of brewing coffee is disclosed including the step of selectively removing a coffee container above the level of the liquid in a coffee pot after completion of a brewing step. A method including depressing coffee grounds disposed in a tray by a float loose with respect to the tray is shown in U.S. Pat. No. 1,873,023 to Peirce. In U.S. Pat. No. 1,887,848 to Peirce a method of brewing coffee is disclosed including the step of automatically effecting reciprocatory relative movement between an outer container and an inner container. U.S. Pat. No. 1,887,849 also to Peirce discloses a method including pumping water from a coffee pot to a coffee grounds container disposed in the pot. In U.S. Pat. No. 3,279,351 to Cohn a method of coffee making is shown comprising the steps of filling a container with water, filling a plunger with coffee, activating plunger drive means, heating the water in said container and lowering the plunger into the water by means of the plunger drive means. U.S. Pat. No. 3,339,476 to DeTroya discloses a method of brewing coffee comprising heating water to a desired temperature and spinning a perforated basket containing coffee grounds in the heated water. In U.S. Pat. No. 4,253,385 to Illy a coffee brewing machine is shown which operates by jetting water through a ground coffee-containing pod and extracting the coffee beverage through a filter. U.S. Pat. No. 4,365,544 to Howitt discloses a method of preparing coffee including rotating a piston containing a flavoring material as it moves axially through a water-filled cylinder. A method of preparing coffee including selectively releasing a floatable brew basket to float on top of brewed coffee at a desired temperature is shown in U.S. Pat. No. 4,401,014 to McGrail et al.

SUMMARY OF THE INVENTION

The present invention discloses an improved method for automatic coffee brewing. The method of the present invention generally includes the steps of automatically lowering into a coffee pot a basket having finely-meshed filters and containing coffee grounds, filling the coffee pot with water to a level above the lowered basket, boiling the water in the coffee pot, steeping the coffee grounds contained in said basket, and automatically raising from the coffee pot the basket containing the coffee grounds. In a further embodiment of the present invention the method includes a step of oscillating the basket within the boiled water during the steeping of the coffee grounds.

An object of this invention is to provide an improved method of preparing brewed coffee.

Another object of the present invention is to provide a method of brewing coffee that extracts the flavorings from coffee grounds in a more efficient manner.

It is also an object of this invention to provide a method of coffee brewing that reduces the amount of coffee grounds required per cup of coffee.

A still further object of the present invention is to provide a method of automatic coffee brewing where each step can be accomplished in a unitary coffee maker device.

These and other objects and advantages of the present invention will be apparent to those skilled in the art from the following description of a preferred embodiment and claims.

DESCRIPTION OF A PREFERRED EMBODIMENT

Figure 2:
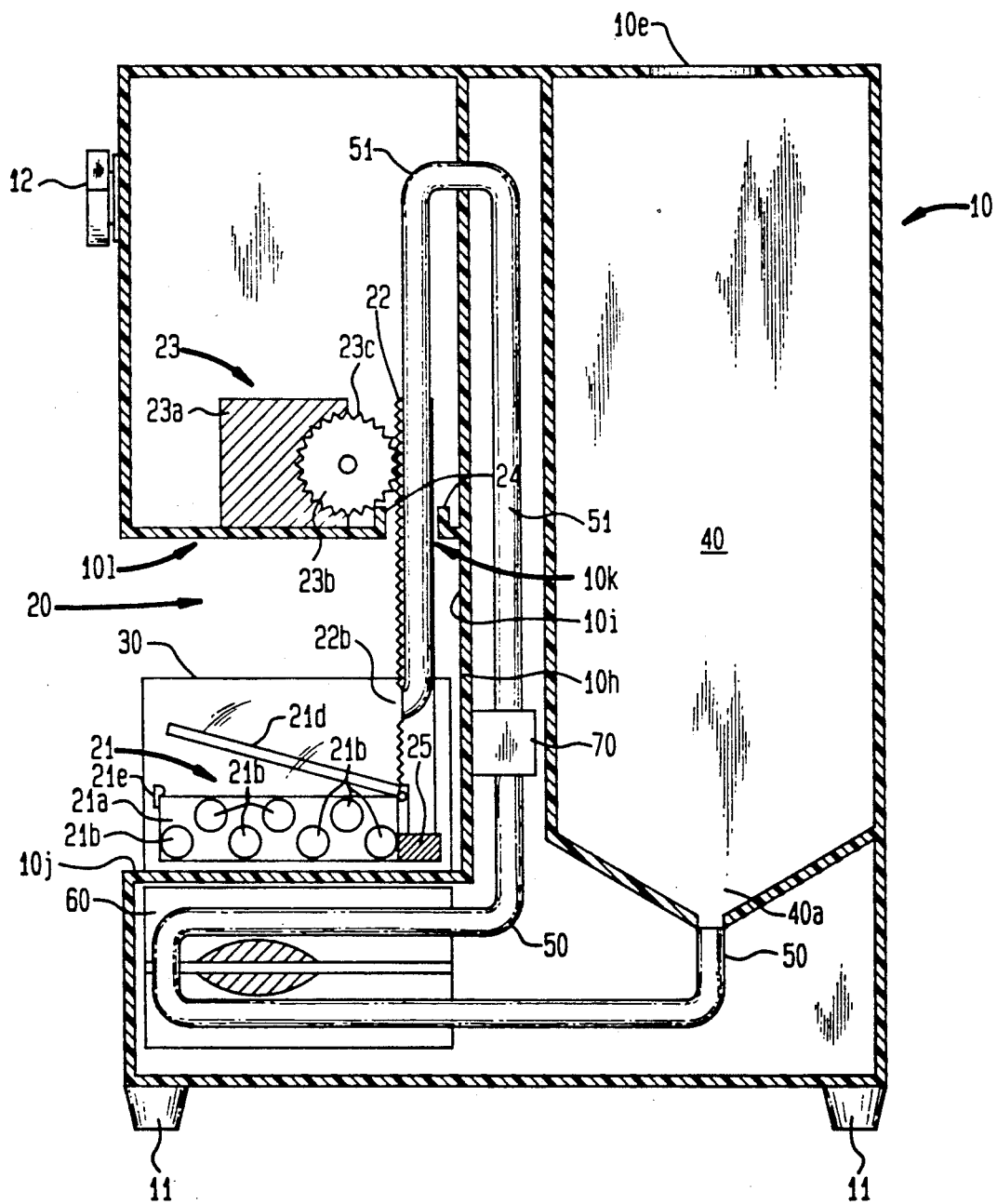
FIG. 2 is a cross-sectional view taken along line A—A of FIG. 1.

The method of the present invention can be carried out utilizing the coffee maker 1 shown in my co-pending patent application, Ser. No. 487,194, now U.S. Pat. No. 5,027,696. Coffee maker 1 generally includes a housing member 10 having a selectively retractable coffee grounds receptacle unit 20 attached to said housing member 10, and a selectively removable coffee pot 30. Housing member 10 is formed as a substantially C-shaped quadrilateral member having a hollow, rear vertical wall 10a, a hollow top wall 10b forwardly extending from and integrally formed with the top portion of said rear wall 10a, and a hollow bottom wall 10c forwardly extending from and integrally formed with the bottom portion of said rear wall 10a in parallel alignment with said top wall 10b. The housing member 10 is preferably formed from heat-resistant plastic or metal material. Support footings 11 are fixedly attached to the bottom surface 10d of said bottom wall 10c. An opening 10e is provided in the top surface 10f of said top wall 10b which communicates with a water storage receptacle 40 (FIG. 2) disposed within the hollow rear wall 10a of said housing member 10. A three-position switch 12 and a timer 13 are disposed in the forward face 10g of the top wall 10b.

The coffee grounds receptacle unit 20 includes a coffee grounds basket 21 that is retractably disposed within the cavity formed by said top wall 10b and said bottom wall 10c by means of a traveling rod 22 as hereinafter described in greater detail. Coffee grounds basket 21 includes a grounds receptacle 21a having a plurality of finely meshed filters 21b, preferably formed from nylon, formed in the side wall 21c of said grounds receptacle 21a. A grounds receptacle lid 21d is hingedly attached to said grounds receptacle 21a and said receptacle lid 21d is securable to said receptacle 21a by snap fastener means 21e disposed on the side wall 21c of said receptacle 21a and said receptacle lid 21d. Traveling rod 22 is a hollow member having a plurality of vertically spaced teeth 22a formed on one side thereof and a water port 22b formed in the lower portion of said rod 22 to permit the flow of water into said coffee pot 30.

Figure 1:
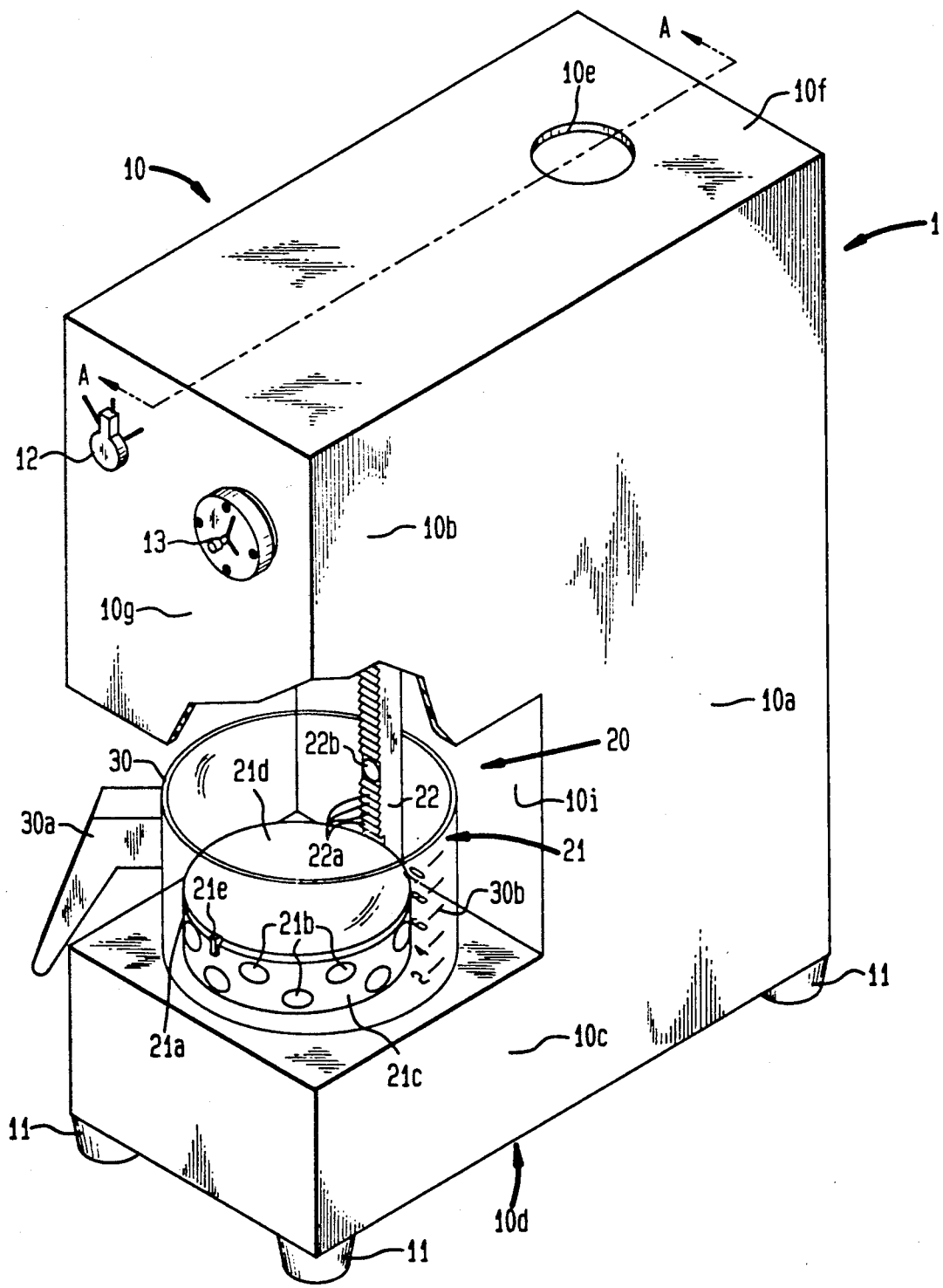
FIG. 1 is a perspective view of a coffee maker suitable for carrying out the method of the present invention.

The coffee pot 30 is disposable within the cavity formed by the top wall 10b and the bottom wall 10c in a manner to permit a coffee grounds basket 21 to be selectively raised and lowered therein. In FIG. 1 the coffee grounds basket 21 is shown in its lowered position. Coffee pot 30 includes a coffee pot handle 30a and marked graduations 30b for measuring the amount of coffee to be made. Said coffee pot 30 is preferably formed having a substantially greater diameter than height so that the traveling rod 22 does not have to move upwardly a great distance to raise the coffee grounds basket 21 above the top of said coffee pot 30.

Water storage receptacle 40 is disposed within the rear wall 10a of said housing member 10 adjacent to the opening 10e formed in the top surface of said top wall 10b. The lower end of said water storage receptacle 40 contracts into a funnel 40a having a first tubing member 50 attached to the opening of said funnel 40a. The first tubing member 50 extends from said water storage receptacle 40 to an electrical heating element 60 in two-pass heat exchanger relationship, continuing therefrom to the entrance port of water pumping means 70 fixedly attached to the inward side 10h of the forward surface 10i of said vertical wall 10a. Said heating element 60 is disposed adjacent to the top surface 10j of the bottom wall 10c of said housing member 10, thereby providing means to heat water disposed in said coffee pot 30. A second tubing member 51, preferably formed from flexible tubing, communicates with the exit port of said water pumping means 70 and continues therefrom to the interior of the hollow traveling rod 22 terminating at the water port 22b of said traveling rod 22.

In addition to the aforementioned coffee grounds basket 21 and traveling rod 22, coffee grounds receptacle unit 20 includes a rotating gear mechanism 23 comprising a gear motor 23a and a gear wheel 23b rotatably attached to said gear motor 23a. Traveling rod 22 extends through an opening 10k formed in the bottom surface 101 of said top wall 10b and is embraced by rod guide supports 24 fixedly attached to the bottom surface 101 of said top wall 10b about said opening 10k. Rod 22 is attached to said coffee grounds basket 21 by means of a horizontally extending block snug 25 fixedly attached to the rear portion of said coffee grounds basket 21. The gear wheel 23b of said rotating gear mechanism 23 is formed with circumferential teeth 23c which engage the teeth 22a of said traveling rod 22, thereby causing the raising and lowering of said traveling rod 22 by selective rotation of said gear wheel 23b. In an alternative embodiment of the gear mechanism 23, the gear motor 23a oscillates the gear wheel 23b in a manner to move the traveling rod 22 and attached basket 21 rhythmically up and down within the pot 30.

The coffee maker 1 of the present invention is preferably wired for automatic operation. With the water storage receptacle 40 filled with water and the coffee grounds basket 21 filled with the appropriate amount of coffee grounds (depending upon the amount of coffee desired), the timer 13 is set and the coffee maker 1 is activated by operation of the switch 12. Thereby the coffee grounds basket 21 is lowered into the coffee pot 30 and the water pumping means 70 is activated to pump water from the water storage receptacle 40 to coffee pot 30. The heating element 60 brings the water contained in the coffee pot 30 to a boil while the coffee grounds basket 21 is disposed within said coffee pot 30. The coffee grounds are then steeped in the water which permits more of the coffee flavorings to be extracted from the grounds. In a coffee maker 1 having an oscillating gear mechanism 23 the basket 21 oscillates up and down within the pot 30 to further enhance extraction of the flavorings from the coffee grounds. The two-pass heat exchanger relationship of said heating element 60 and said first tubing 50 permits preheating of the water to be used for brewing the coffee. After the appropriate time the coffee grounds basket 21 is raised from the coffee pot 30 by automatic operation of the rotating gear mechanism 23.

While the coffee maker 1 of the present invention has been described in reference to a preferred embodiment, various changes and modifications may be made without departing from the spirit and scope of the present invention as held in the appended claims, and such changes and modifications are intended as part of the present invention.

Therefore in view of the foregoing I claim:

1. A method of automatically preparing coffee in a coffee maker for more efficient use of coffee grounds comprising the steps of:

filling a water storage receptacle disposed in the coffee maker with water;

filling a coffee grounds basket disposed in the coffee maker with coffee grounds;

enclosing the coffee grounds in the coffee grounds basket by closing a basket lid onto said coffee grounds basket after filling the coffee basket with coffee grounds;

setting a timer disposed in the coffee maker for selecting the length of time for operation of the coffee maker;

activating the operation of the coffee maker by means of a switch disposed in the coffee maker;

lowering the coffee grounds basket into a coffee pot in response to activating the switch by means of a rotating gear mechanism communicating with a traveling rod attached to the coffee grounds basket;

pumping water from the water storage receptacle to the coffee pot in response to activating the switch;

heating the water in the coffee pot to a boil by means of a heating element disposed in the coffee maker in response to activating the switch;

steeping the coffee grounds contained in the basket in the boiled water; and raising the coffee grounds basket from the coffee pot in accordance with the length of time selected by the timer by means of the rotating gear mechanism.

2. A method of automatically preparing coffee in a coffee maker for more efficient use of coffee grounds as in claim 1 furthering comprising the step of oscillating the basket within said coffee pot during steeping the coffee grounds.

3. A method of automatically preparing coffee in a coffee maker for more efficient use of coffee grounds as in claim 1 further comprising the step of preheating the water from the water storage receptacle prior to entry into the coffee pot.

4. A method of automatically preparing coffee as in claim 3 wherein said preheating is accomplished by means of a tubing member extending from the water storage receptacle to the heating element in two-pass heat exchanger relationship.

5. A method of automatically preparing coffee in a coffee maker for more efficient use of coffee grounds comprising the steps of:

filling a water storage receptacle disposed in the coffee maker with water;

filling a coffee grounds basket disposed in the coffee maker with coffee grounds;

enclosing the coffee grounds in the coffee grounds basket by closing a coffee basket lid pivotally-mounted onto said coffee basket after filling the coffee basket with coffee grounds;

setting a timer disposed in the coffee maker for selecting the length of time for operation of the coffee maker;

activating the operation of the coffee maker by means of a switch disposed in the coffee maker;

lowering the coffee grounds basket into a coffee pot in response to activating the switch by means of a rotating gear mechanism communicating with a traveling rod attached to the coffee grounds basket;

pumping water from the water storage receptacle to the coffee pot in response to activating the switch;

preheating the water from the water storage receptacle by means of a heating element disposed in the coffee maker in response to activating the switch;

heating the water in the coffee pot to a boil by means of the heating element;

steeping the coffee grounds contained in the basket in the boiling water; and raising the coffee grounds basket from the coffee pot in accordance with the length of time selected by the timer by means of the rotating gear mechanism.

6. A method of automatically preparing coffee in a coffee maker for more efficient use of coffee grounds as in claim 5 further comprising the step of oscillating the basket within said coffee pot during steeping of the coffee grounds.

* * * * *